US007714902B2

(12) United States Patent
Yuyama

(10) Patent No.: US 7,714,902 B2
(45) Date of Patent: May 11, 2010

(54) IMAGE PICK-UP APPARATUS, METHOD OF CONTROLLING WHITE BALANCE, AND PROGRAM OF CONTROLLING WHITE BALANCE

(75) Inventor: Masami Yuyama, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 738 days.

(21) Appl. No.: 11/053,116

(22) Filed: Feb. 7, 2005

(65) Prior Publication Data
US 2005/0174442 A1   Aug. 11, 2005

(30) Foreign Application Priority Data
Feb. 10, 2004  (JP)  ............... 2004-032802

(51) Int. Cl.
H04N 9/73    (2006.01)
H04N 5/232   (2006.01)
(52) U.S. Cl. ............... 348/223.1; 348/211.99; 348/226.1; 348/227.1
(58) Field of Classification Search ............. 348/222.1, 348/223.1, 220.1, 211.99, 211.1, 211.2, 211.6, 348/225.1, 226.1, 227.1, 228.1, 345, 349
See application file for complete search history.

(56) References Cited

U.S. PATENT DOCUMENTS

| | | | | |
|---|---|---|---|---|
| 4,584,598 A | * | 4/1986 | Kutaragi | 348/226.1 |
| 5,099,313 A | * | 3/1992 | Suemoto et al. | 348/226.1 |
| 5,732,293 A | * | 3/1998 | Nonaka et al. | 396/157 |
| 5,995,144 A | * | 11/1999 | Sasakura | 348/350 |
| 6,262,767 B1 | * | 7/2001 | Wakui | 348/211.99 |
| 6,275,307 B1 | * | 8/2001 | Segawa | 358/446 |
| 7,006,135 B2 | * | 2/2006 | Ishimaru et al. | 348/223.1 |
| 2003/0231248 A1 | | 12/2003 | Yuyama et al. | |

FOREIGN PATENT DOCUMENTS

CN    1469636 A    1/2004

(Continued)

OTHER PUBLICATIONS

Chinese Office Action (and English translation thereof) dated Feb. 15, 2008, issued in a counterpart Chinese Application.

Primary Examiner—David L Ometz
Assistant Examiner—Peter Chon
(74) Attorney, Agent, or Firm—Frishauf, Holtz, Goodman & Chick, P.C.

(57) ABSTRACT

In a camera apparatus of the present invention, a phase difference sensor, which is normally used for automatic focusing operation, is effectively used to detect a flicker of the fluorescent light (S104), and it is judged whether the flicker has been detected or not (S105). When the flicker has been detected, gain No. (3) prepared for the fluorescent light is selected to be set to a gain control circuit at a time of a capture (S106). The infrared light is detected (S107) based on an output used from an infrared light sensor, which is provided for receiving an infrared-light code signal from a remote control unit, and it is judged whether the infrared light has been detected or not (S108). When the infrared light has been detected, gain No. (4) prepared for the incandescent light is selected to be set to a gain control circuit (S109).

10 Claims, 5 Drawing Sheets

FOREIGN PATENT DOCUMENTS

| | | |
|---|---|---|
| JP | 2-126785 A | 5/1990 |
| JP | 7-75113 A | 3/1995 |
| JP | 7-225413 A | 8/1995 |
| JP | 8-32990 A | 2/1996 |
| JP | 2000-23040 A | 1/2000 |
| JP | 2003-264850 A | 9/2003 |
| JP | 2004-012815 A | 1/2004 |
| KR | 2003-0005737 A | 1/2003 |
| KR | 2003-0057465 A | 7/2003 |
| KR | 2003-0096069 A | 12/2003 |

\* cited by examiner

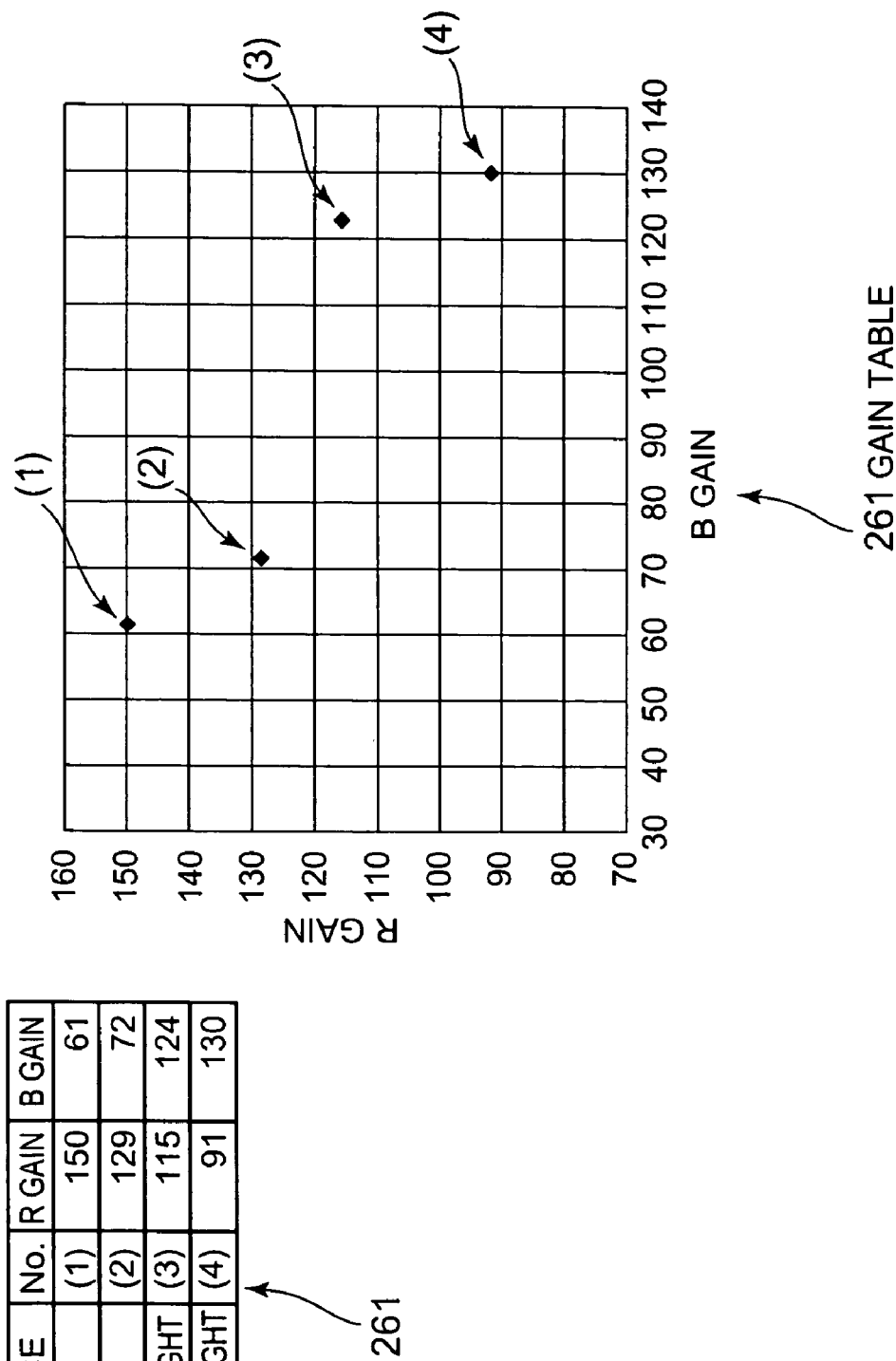

IMAGE PICK-UP APPARATUS, METHOD OF CONTROLLING WHITE BALANCE, AND PROGRAM OF CONTROLLING WHITE BALANCE

BACKGROUND OF THE INVENTION

1. Field of the Invention

The present invention relates to an image pick-up apparatus, a method of white balance control and a program for white balance control.

2. Description of the Related Art

In most of conventional digital cameras or image pick-up apparatuses, an image of an object photographed or obtained using a solid state image pick-up element such as CCD is displayed as a through (finder) image on a liquid crystal display monitor independently of a shutter operation by a user. In this sort of digital camera, a white balance has to be adjusted for faithfully reproducing colors of the object. The white balance is adjusted to photograph a white object in a white color even in case that the object is photographed under various lights of different color temperatures. The white balance is secured by adjusting gains of an image signal output from the solid state image pick-up element, that is, by adjusting gains respectively for R color component, G color component and B color component of the image signal depending on the surroundings (light source) for photographing the object (photographing surroundings). Therefore, if gain-correction coefficients used as gain values and standards for plural sorts of expected photographing surroundings are prepared and stored in a memory in advance, the user can near-perfectly adjust the white balance of the image that he or she is going to photograph by using these gain-correction coefficients depending on the photographing surroundings. The white balance adjusting operation mentioned above requires the user to make troublesome operation, and therefore an automatic function for automatically adjusting the white-balance has been proposed. In a general technique for adjusting the white balance, a light source in the photographing surrounding where a through image is photographed, is judged based on the color temperatures of the through image and the like, and gains for R component and B component contained in image data are adjusted based on the judged light source (for example, refer to a Patent Document #1).

A conventional technique is also used, which detects a flicker based on an image obtained by CCD to judge the light source, and determines that the light source is a fluorescent lamp when the flicker is detected.

[Patent Document #1] Japanese Laid-Open Patent Specification No. 2003-264850

However, to detect the flicker in the image data obtained by CCD as described above, it is necessary to obtain about 30 photographs per second. Therefore, when a picture is taken in a dark surrounding such as in a room, the number of photographs taken in a second is reduced by the automatic exposure function (AE function), and therefore it is difficult to detect the flicker of the fluorescent lamp, resulting in failure in correctly determining the light source. In general, since a cover glass of the image pick-up optical system and CCD is provided with a filtering function for filtering the infrared rays, it is hard to determine whether the light source is an incandescent lamp or not by detecting the infrared rays from the image obtained by CCD. Therefore, it is not possible to control the white balance by using CCD which is one of conventional sensors in the image pick-up apparatus.

The present invention has been made in consideration of the above mentioned problems, and has an object to provide an image pick-up apparatus which can control the white balance by effectively using conventionally available sensors in the conventional image pick-up apparatus, a white balance control method, and a program for controlling the white balance.

SUMMARY OF THE INVENTION

According to one aspect of the invention, there is provided an image pick-up apparatus having a phase difference sensor with a light receiving element, and for automatically controlling focus of an image pick-up unit for photographing an object, based on an output from the light receiving element of the phase difference sensor, which image pick-up apparatus comprises a detecting unit for detecting a flicker based on the output from the light receiving element of the phase difference sensor, and a control unit for controlling white balance of an image photographed by the image pick-up unit, based on the result of the detection by the detecting unit. According to other aspect of the invention, there is provided an image pick-up apparatus having an infrared ray sensor for receiving an infrared ray signal sent from a remote control unit, and for executing a preset action based on the infrared ray signal received by the infrared ray sensor, which image pick-up apparatus comprises a detecting unit for detecting infrared rays in surroundings for photography, based on an output from the infrared ray sensor while the infrared ray sensor receives no infrared ray signal, and a control unit for controlling white balance of an image photographed by an image pick-up unit, based on the result of the detection by the detecting unit.

According to another aspect of the invention, there is provided an image pick-up apparatus having a phase difference sensor with a light receiving element, and for automatically controlling focus of an image pick-up unit for photographing an object, based on an output from the light receiving element of the phase difference sensor, and further having an infrared ray sensor for receiving an infrared ray signal sent from a remote control unit, and for executing a preset action based on the infrared ray signal received by the infrared ray sensor, which image pick-up apparatus comprises a first detecting unit for detecting a flicker based on the output from the light receiving element of the phase difference sensor, a second detecting unit for detecting infrared rays in surroundings for photography, based on an output from the infrared ray sensor while the infrared ray sensor receives no infrared ray signal, and a control unit for controlling white balance of an image photographed by the image pick-up unit, based on the result of the detection by at least one of the first and second detecting unit.

According to still another aspect of the invention, there is a method of controlling white balance in an image pick-up apparatus having a phase difference sensor with a light receiving element, and for automatically controlling focus of an image pick-up unit for photographing an object, based on an output from the light receiving element of the phase difference sensor, which method comprises detecting a flicker based on the output from the light receiving element of the phase difference sensor, and controlling white balance of an image photographed by the image pick-up unit, based on the result of the detection.

According to yet another aspect of the invention, there is provided a method of controlling white balance in an image pick-up apparatus having an infrared ray sensor for receiving an infrared ray signal sent from a remote control unit, and for executing a preset action based on the infrared ray signal received by the infrared ray sensor, which method comprises detecting infrared rays in surroundings for photography, based on an output from the infrared ray sensor while the infrared ray sensor receives no infrared ray signal, and controlling white balance of an image photographed by an image pick-up unit, based on the result of the detection.

According to still other aspect of the invention, there is provided a method of controlling white balance in an image pick-up apparatus having a phase difference sensor with a light receiving element, and for automatically controlling focus of an image pick-up unit for photographing an object, based on an output from the light receiving element of the phase difference sensor, and further having an infrared ray sensor for receiving an infrared ray signal sent from a remote control unit, and for executing a preset action based on the infrared ray signal received by the infrared ray sensor, which method comprises a first step of detecting a flicker based on the output from the light receiving element of the phase difference sensor, a second step of detecting infrared rays in surroundings for photography, based on an output from the infrared ray sensor while the infrared ray sensor receives no infrared ray signal, and a third step of controlling white balance of an image photographed by the image pick-up unit, based on the result of the detection in at least one of the first and second step.

In the image pick-up apparatus according to the present invention, the white balance of a photographed image can be controlled by effectively using a phase difference sensor necessary for executing an automatic focus controlling operation and an infrared ray sensor necessary for remote control, or by using both the phase difference sensor and infrared ray sensor.

BRIEF DESCRIPTION OF THE DRAWINGS

FIG. 2A is a view showing a structure of a gain table.

FIG. 2B is a view showing a concept of the structure of the gain table.

DETAILED DESCRIPTION OF THE PREFERRED EMBODIMENTS OF THE INVENTION

Now, an embodiment of the present invention will be described with reference to the accompanying drawings.

Figure 1:
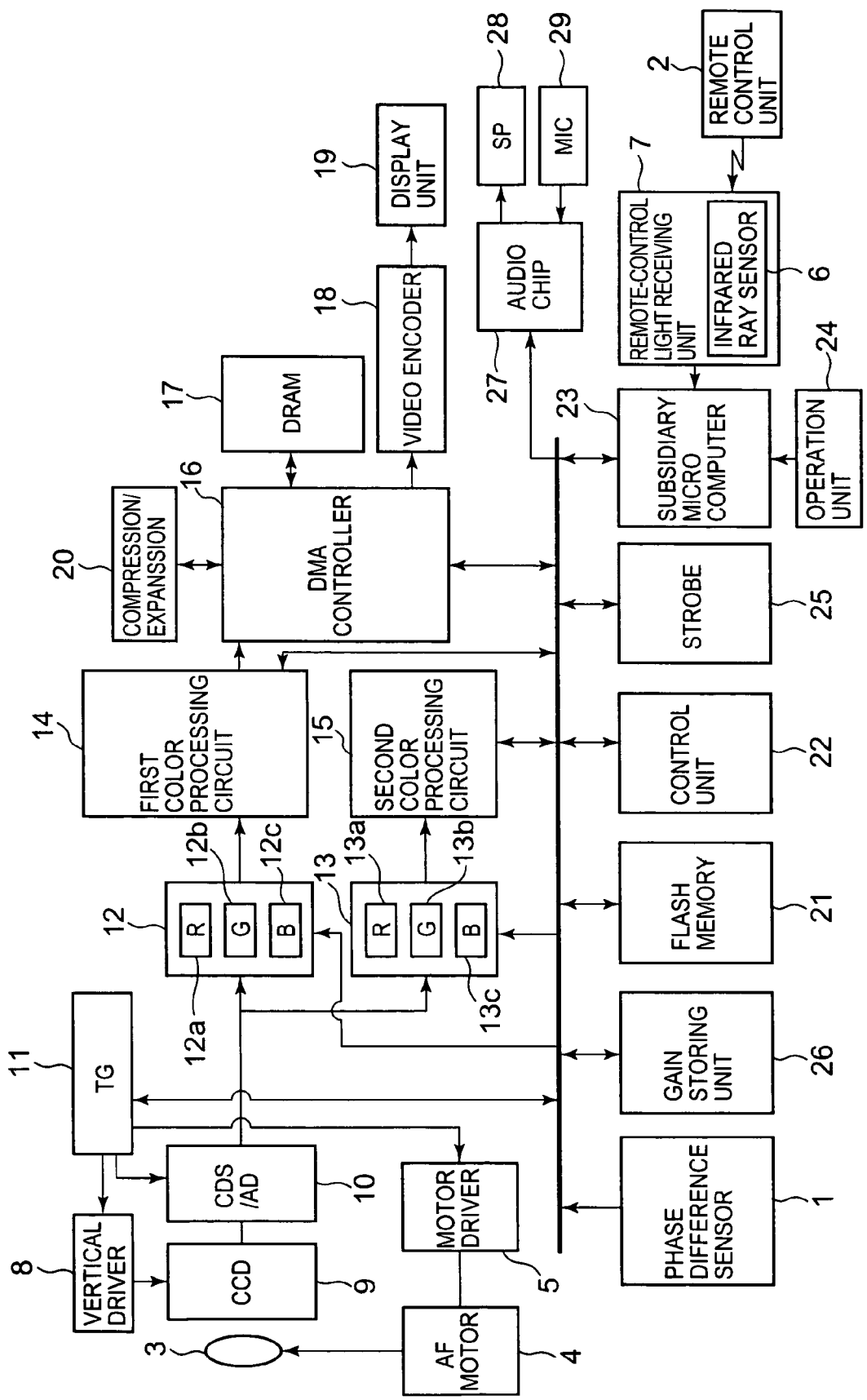
FIG. 1 is a block diagram showing a circuit configuration of a digital camera according to one embodiment of the present invention.

FIG. 1 is a block diagram showing a circuit configuration of a digital camera according to the embodiment of the invention. The digital camera has an auto-focus function (AF function) using a phase difference sensor 1 as well as a remote control function using a remote control unit 2. The digital camera comprises the phase difference sensor 1, a focus lens 3 movable along its optical axis direction, AF motor 4 for driving the focus lens 3 along the optical axis direction, and a motor driver 5 for driving AF motor 4. The digital camera further comprises a remote-control light receiving unit 7 having an infrared-ray sensor 6 which receives an infrared-ray code signal sent from the remote control unit 2 in response to operation of a user.

CCD 9 driven by a vertical driver 8 is disposed on a rear side of the focus lens 3. Operation timing of the vertical driver 8, the driver 5 and a unit circuit 10 is controlled by a control unit 22 via a timing signal generator 11. CCD 9 comprises a color filter array of the primary colors RGB. An optical image focused on a light receiving surface of CCD9 is charge-storaged at light receiving sections of RGB to be converted into RGB charge signals each having a level proportional to light intensity, and then is output as an analogue image signal to the unit circuit 10. The unit circuit 10 comprises CDS for removing noises from an image pick-up signal input thereto and A/D converter for the image pick-up signal with noises removed into digital image data. The image data output from the unit circuit 10 is delivered to a thirst gain control circuit 12 and a second gain control circuit 13.

The first and second gain control circuit 12, 13 comprise amplifiers 12a, 13a for R signal, amplifiers 12b, 13b for G signal, and amplifiers 12c, 13c for B signal, respectively. A gain of each of the amplifiers 12a, 13a, 12b, 13b, 12c and 13c is controlled by the first gain control circuit 12. The image signal amplified by the first gain control circuit 12 is sent to a first color processing circuit 14 to be subjected to a color processing and is written onto a buffer of DMA controller 16 as YUV data including a digital luminance signal (Y signal) and a color-difference signal (Cd signal, Cr signal) At the same time, image data of R, G, B which has not yet been subjected the color processing is written onto the buffer. DMA controller 16 transfers to a designated areas and expands YUV data written onto the buffer.

A video encoder 18 generates a video signal based on YUV data read out from the buffer and outputs the video signal to a display unit 19 including LCD, whereby a through image of a photographed object is displayed on the display unit 19 when REC through mode (a standby state) is set. When a shutter key is depressed half way (half shutter), as will be described later, the control unit 22 calculates the distance from the digital camera to the object based on the output signals from two line sensors of the phase difference sensor 1 and AF control is executed using the calculated distance. Further, at the time when an image pick-up instruction is given when the shutter key is depressed full way, YUV data for one frame written on the buffer is sent to a compression/expansion unit 20, where the YUV data is subjected to a compression process, and recorded on a flash memory 21. When a playback mode is set to reproduce an image, image data recorded on the flash memory 21 is sent to the compression/expansion unit 20 through DMA controller 16, where the image data is subjected to an expansion process, whereby YUV data is reproduced to be displayed on the display unit 19.

Meanwhile, the image signal amplified by the second gain control circuit 13 is sent to the second color processing circuit 15, where the image signal is subjected to the color processing to obtain YUV data, and the YUV data including digital luminance signal (Y signal) and a color-difference signal (Cd signal, Cr signal) is sent to the control unit 22. The control unit 22 comprises ROM where a program and data are stored and RAM for working operation. The control unit 22 controls operation of each of the units in accordance with a predetermined program, and realizes various functions of the digital camera in response to state signals sent from a operation unit 24. The operation unit 24 is provided with various sorts of keys, such as the shutter key, a switching key for switching REC through mode and the PLAY mode, and the like. The operation unit 24 sends to the control 22 a state signal corresponding to key operation. A strobe unit 25 is driven according to need in response to shutter key operation (in a photographing mode) to irradiate auxiliary light. Note that the present digital camera is provided with an audio chip 27, a speaker 28 and a microphone 29, and is capable of recording and reproducing sounds.

Figure 3A:
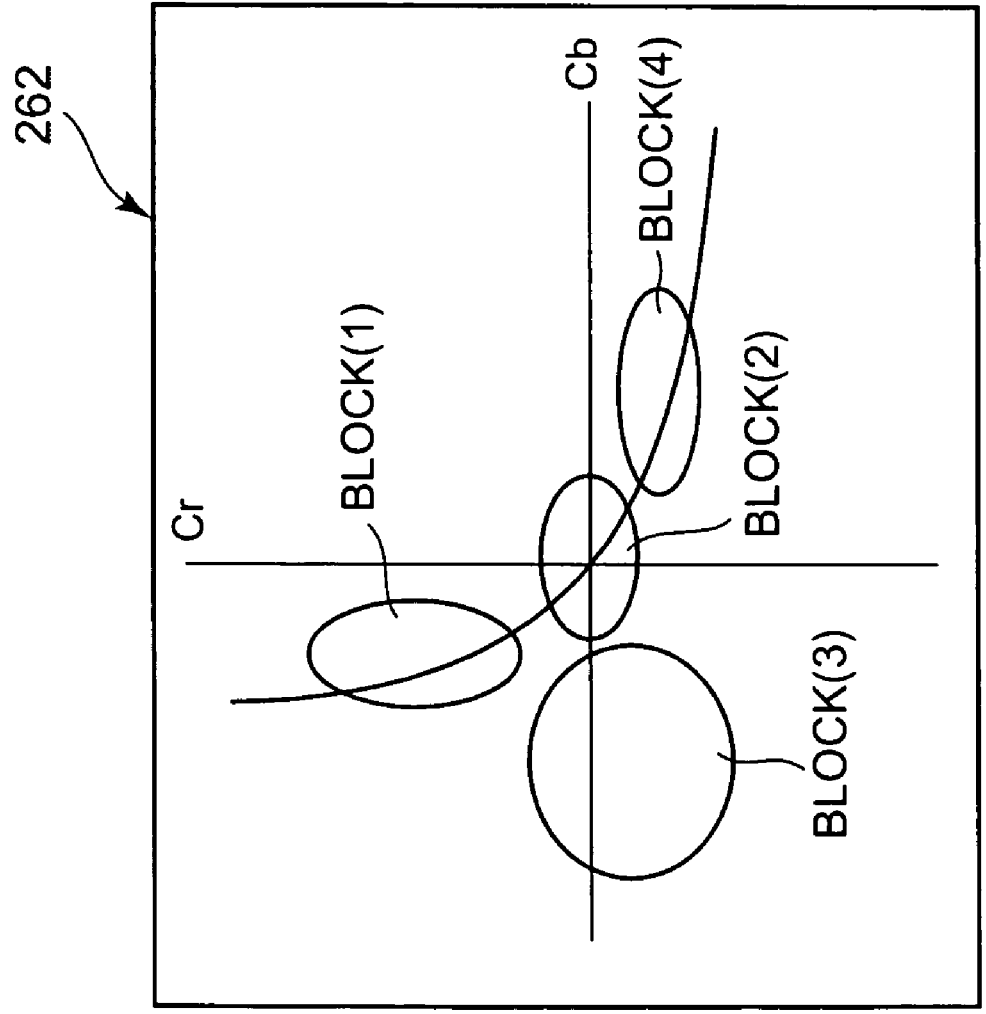
FIG. 3A is a view showing a concept of a structure of a block table.

A gain storing unit 26 stores gains set respectively to the amplifier 12a for R signal and the amplifier 12c for B signal in the first gain control circuit 12 and gains set respectively to the amplifier 13a for R signal and the amplifier 13c for B signal in the second gain control circuit 13. In other words, gain tables shown in FIG. 2A and FIG. 2B and a block table 262 shown in FIG. 3A are stored in the gain storing unit 26.

The gain tables 261, 261 shown in FIG. 2A and FIG. 2B are used to set gains respectively to the amplifier 12a for R signal and the amplifier 12c for B signal in the first gain control unit 12 when a white balance is automatically controlled by the control unit 22 with no strobe light irradiated by strobe 25. R gain values and B gain values corresponding to the gains (1) to (4) shown in FIG. 2B are stored in the gain storing unit 26. Gain No. (1) consists of R gain value and B gain value for setting an appropriate white balance when photographing in shade. Gain No. (2) consists of R gain value and B gain value for setting an appropriate white balance when photographing under the sun light. Gain No. (3) consists of R gain value and B gain value for setting an appropriate white balance when photographing under fluorescent lights. Gain No. (4) consists of R gain value and B gain value for setting an appropriate white balance when photographing under incandescent light.

Figure 3B:
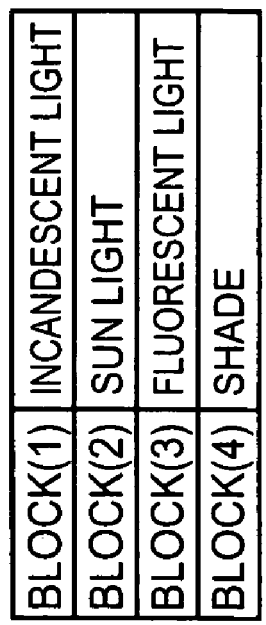
FIG. 3B is a view for explaining blocks of the block table shown in FIG. 3A.
Figure 4:
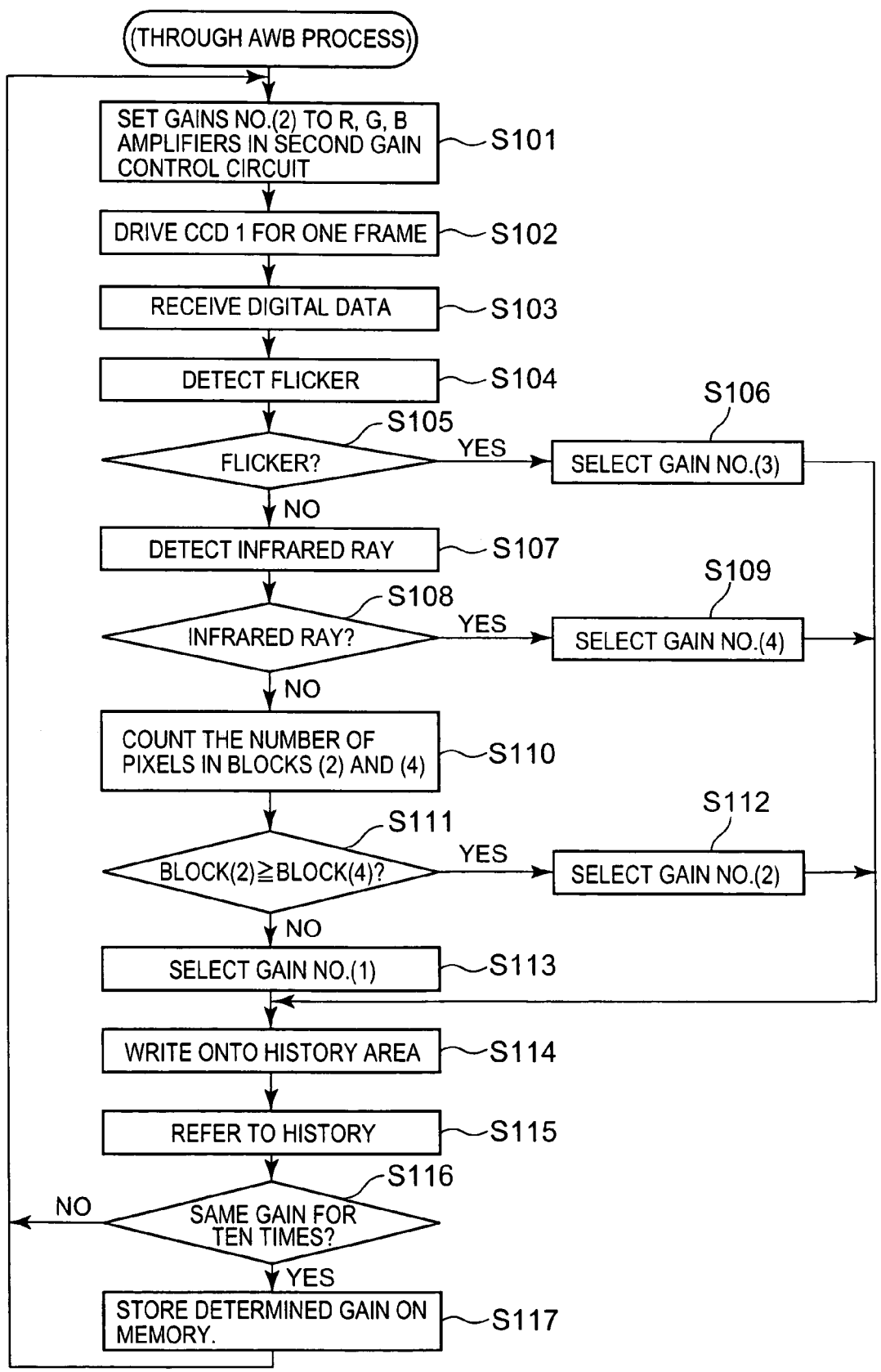
FIG. 4 is a flow chart of operation in REC through mode in the present embodiment.

The block table 262 shown in FIG. 3B is used to set gains respectively to the amplifier 12a for R signal and the amplifier 12c for B signal in the first gain control unit 12 when a white balance is automatically controlled by the control unit 22. In the block table 262 shown in FIG. 3A, the block (1) represents an area for incandescent light, the block (2) represents an area for sunlight, the block (3) represents an area for fluorescent lights, and the block (4) represents an area for shade.

Now, operation in a through AWB process (through automatic white balancing process), that is, in REC through mode with the shutter key not operated in AWB mode (automatic white balancing mode) in the embodiment having the above mentioned configuration will be described in accordance with a flow chart shown in FIG. 7.

When REC through mode is set, the control unit 22 operates based on the program so as to execute processes in accordance with flow chart of FIG. 7 until the shutter key is depressed half way by the user. The amplifiers 13a, 13b, and 13c for R, G, and B signal in the second gain control circuit 13 are set to the gains given in the gain No. (2) at step S101. The gain No. (2) shows a gain pattern in the sunlight, and R GAIN=129 and B GAIN=72 as shown in FIG. 2A. Therefore, the amplifier 13a for R signal is set to a value of "129" and the amplifier 13b for G signal is set to a value of "72". Then, CCD 9 is driven for one frame at step S102. The digital image data for one frame output from the unit circuit 10 is received at step S103 through the second gain control circuit 13, the gain of which has been set as described above.

The flicker of the fluorescent lamp is detected based on an output signal from the line sensor of the phase difference sensor 1 at step S104. At step S105, it is judged whether or not the flicker has been detected. When the flicker has been detected, the gain No. (3) for the fluorescent light is selected at step S106 as a gain to be set to the first gain control circuit 12 at a time of a capture to be described later.

When no flicker has been detected, the infrared ray is detected at step S107 in the surroundings where a picture is photographed, based on the output from the infrared-ray sensor 6 which is not in a state for receiving the infrared-ray code signal from the remote-control unit 2. It is judged at step S108 whether the infrared ray has been detected or not. When the infrared ray has been detected, the gain No. (4) for the incandescent light is selected at step S109 as a gain to be set to the first gain control circuit 12.

When no infrared ray has been detected, the number of pixels in the image data, distributed in the blocks (2) and (4) shown in FIG. 3A is counted at step S110. Further, it is judged at step S111 whether or not it is true that the number of the pixels in the block (2) is not less than that in the block (4). When it is true that the number of the pixels in the block (2) is not less than the in the block (4), the gain No. (2) for the sun light is selected at step S112 as a gain to be set to the first gain control circuit 12. When it is true that the number of the pixels in the block (2) is less than that in the block (4), the gain No. (1) for shade is selected at step S113 as a gain to be set to the first gain control circuit 12.

As described above, either the gain (1), (2), (3) or (4) is selected in either step S106, S109, S112 or S113 as the gain to be set to the first gain control circuit 12 at the time of capture. When the gain to be set to the first gain control circuit 12 is selected as described above, the control unit 22 writes the selected gain number onto a history area previously prepared in the work RAM at step S114. Therefore, the processes are executed in accordance with the flow chart until the shutter key is depressed half way, whereby the gain number of the gain to be set to the gain control amplifier 12 is written onto the history area of the work RAM in chronological order.

The history area of the work RAM is referred at step S115, and it is judged at step S116 whether or not the gain of the same gain number has successively been selected for ten times. When the gain of the same gain number has not been selected successively for ten times, due to some reason such as change in the surroundings, then the processes at steps 101 through 116 are repeatedly executed. When the gain of the same gain number has successively been selected for ten times due to reason such as no change in the surroundings, the gain number of the gain (gain value) which has successively been selected for ten times and has been selected this time is stored in a predetermined area of the work RAM at step S117. In the process at step S117, the gain to be set at the time of capture is finally determined.

Meanwhile, the user determines an object and a picture composition viewing an image displayed on the display unit 19 in the REC through mode, and he or she depresses the shutter key half way when the object and the picture composition have been determined. Then, the control unit 22 executes a distance measuring process based on the output signal from the line sensor of the phase difference sensor 1 to calculate a distance to the object. Further, the control unit 22 controls the motor driver 5 based on the calculated distance to drive the AF motor 4 for moving the focus lens 3 along the optical axis, whereby an object image is focused on CCD 9 and the focused object image is displayed on the display unit 19.

Figure 5:
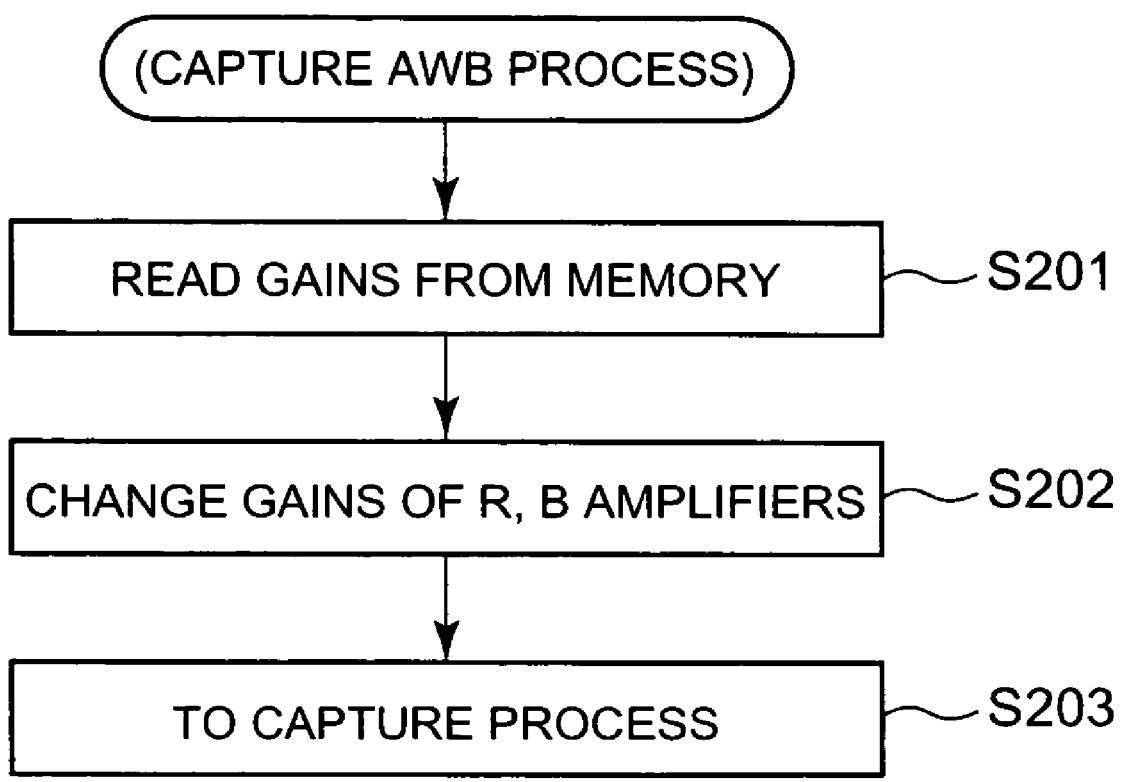
FIG. 5 is a flow chart of operation of a capture AWB process.

When the user confirms the focused object image on the display unit 19 and depresses full way the shutter key which has been depressed half way, the control unit 22 executes a capture AWB process shown by a flow chart of FIG. 5 in accordance with a predetermined program. The gain No. (or a gain value) stored at step S117 of FIG. 5 is read out at step S201. The amplifier 12a for R signal and amplifier 12c for B signal in the first gain control circuit 12 are changed to the gain values corresponding to the read out gain No. or to the read out gain at step S202. Note that the amplifier 12b for G signal has been set to a predetermined gain. Then, the capture process is executed at step S203. The amplifier 12a for R signal and amplifier 12c for B signal in the first gain control circuit 12 amplify the digital image data (R component, B component) of the optical image delivered from the unit circuit 10 at the gains set at step S113, respectively. As described above, the image signal amplified by the first gain control circuit 12 is sent to the first color processing circuit 14 to be subjected to the color processing. The color processed signal, that is, YUV data including a digital luminance signal (Y signal) and a digital color difference signal (Cb signal, Cr signal) is written onto the buffer of DMA controller 16. YUV data for one frame, written onto the buffer is delivered to a compression/expansion unit 20 to be subjected to the compression process, and the compressed data is recorded on a flash memory 21, whereby the image data of the object, the white balance of which is properly adjusted, can be recorded on the flash memory 21.

When the recorded image data is reproduced, the user operates the remote-control unit 2. The remote-control unit 2 dispatches the infrared-ray code signal and this infrared-ray code signal is received by the infrared-ray sensor 6 of the remote-control light receiving unit 7. A subsidiary micro computer 23 analyzes a command of the infrared-ray code signal on the basis of the previously stored relationship between the infrared-ray codes and commands, and sends the command to the control unit 22. The control unit 22 executes a process corresponding to the sent command, whereby the process corresponding to the operation performed by the user using the remote control unit 2 is executed.

As described, since the subsidiary micro computer 23 can analyze the relationship between the received infrared ray code signal and the command, the micro computer 23 delivers to the control unit 22 information indicating that the received infrared ray is not the infrared-ray cod signal, when the received infrared ray does not correspond to any command. Therefore, upon receipt of the information delivered from the subsidiary micro computer 23, the control unit 22 can detect the infrared ray at step 107, and judge at step S108 whether the infrared ray has been detected or not, based on the output from the infrared-ray sensor 6 when the infrared-ray code signal is not received.

Two types of the phase difference sensors are available. A first type of phase difference sensor has only a function which outputs signals from two line sensors, based on which signals a control unit calculates a distance to an object. A second type of phase difference sensor which executes a measuring process based on signals from two line sensors, and output the resultant distance information to a control unit. The present embodiment employs the first type of phase difference sensor 1. But, when the second type of phase difference sensor is employed, it is impossible to detect the flicker based on the signals form the line sensors, because the signals from the line sensors are not entered to the control unit 22. In this case, if a modification is made such that not only the distance information from the phase difference sensor but signals from the line sensors of the phase difference sensor are entered to the control unit 22, the flicker can be detected by the control unit 22 in similar processes to those shown in the above mentioned flow chart.

Further, as described above in parentheses, the gain to be stored in the memory at step S117 may be gain No. or gain values corresponding to the gain No. Furthermore, in the present embodiment has been described the digital camera, in which, when the shutter key is depressed with the through image displayed, the image photographed at the time is recorded. The present invention is not limited to such digital camera but also may be applied to any apparatuses having the automatic white-balance control function for a photographed image.

What is claimed is:

1. An image pick-up apparatus comprising:
an image pickup unit;
an infrared ray sensor for receiving an infrared ray;
a function control unit which determines whether the infrared ray received by the infrared ray sensor corresponds to a command of an infrared ray code signal sent from a remote control unit, and which executes a preset action based on the command of the infrared ray code signal when the received infrared ray is determined to correspond to the command of the infrared ray code signal sent from the remote control unit; and
a white balance control unit which, when the infrared ray received by the infrared ray sensor is determined not to correspond to the command of the infrared ray code signal sent from the remote control unit, judges a type of a light source in surroundings for photography based on the received infrared ray, and which controls white balance of an image photographed by the image pick-up unit based on the judged type of the light source.

2. The image pickup apparatus according to claim 1, wherein the white balance control unit comprises:
amplifiers for amplifying respective color components included in an image pick-up signal output from the image pick-up unit; and
a setting unit for setting respective gains to the amplifiers based on the judged type of the light source.

3. The image pickup apparatus according to claim 2, further comprising:
a set gain memory for storing the respective gains which are set for the respective color components of the image pickup signal, wherein the setting unit reads out from the set gain memory gains corresponding to the judged type of the light source and sets the read out gains to the amplifiers.

4. A method of controlling white balance in an image pickup apparatus which includes an image pickup unit and an infrared ray sensor for receiving an infrared ray, the method comprising:
determining whether the infrared ray received by the infrared ray sensor corresponds to a command of an infrared ray code signal sent from a remote control unit;
executing a preset action based on the command of the infrared ray code signal when the received infrared ray is determined to correspond to the command of the infrared ray code signal sent from the remote control unit;
judging a type of a light source in surroundings for photography when the infrared ray received by the infrared ray sensor is determined not to correspond to the command of the infrared ray code signal sent from the remote control unit; and
controlling the white balance of an image photographed by the image pick-up unit based on the judged type of the light source.

5. A computer readable medium having recorded thereon a program for controlling white balance in an image pickup apparatus which includes an image pickup unit and an infrared ray sensor for receiving an infrared ray, wherein the program controls the image pickup apparatus to perform functions comprising:
determining whether the infrared ray received by the infrared ray sensor corresponds to a command of an infrared ray code signal sent from a remote control unit;
executing a preset action based on the command of the infrared ray code signal when the received infrared ray is determined to correspond to the command of the infrared ray code signal sent from the remote control unit;

judging a type of a light source in surroundings for photography when the infrared ray received by the infrared ray sensor is determined not to correspond to the command of the infrared ray code signal sent from the remote control unit; and controlling the white balance of an image photographed by the image pick-up unit based on the judged type of the light source.

6. An image pick-up apparatus comprising:

an image pickup unit for photographing an object;

a phase difference sensor having a light receiving element;

a focus control unit which automatically controls focus of the image pickup unit, based on an output from the light receiving element of the phase difference sensor;

an infrared ray sensor for receiving an infrared ray a function control unit which determines whether the infrared ray received by the infrared ray sensor corresponds to a command of an infrared ray code signal sent from a remote control unit, and which executes a preset action based on the command of the infrared ray code signal when the received infrared ray is determined to correspond to the command of the infrared ray code signal sent from the remote control unit; and a white balance control unit for judging a type of a light source in surroundings for photography when: (i) the light receiving element of the phase difference sensor detects flicker, and (ii) the infrared ray received by the infrared ray sensor is determined not to correspond to the command of the infrared ray code signal sent from the remote control unit, and for controlling white balance of an image photographed by the image pickup unit based on the judged type of the light source.

7. The image pickup apparatus according to claim 6, wherein the white balance control unit comprises:

amplifiers for amplifying respective color components included in an image pick-up signal output from the image pick-up unit; and a setting unit for setting respective gains to the amplifiers based on the judged type of the light source.

8. The image pickup apparatus according to claim 7, further comprising:

a set gain memory for storing the respective gains which are set for the respective color components of the image pickup signal, wherein the setting unit reads out from the set gain memory gains corresponding to the judged type of the light source and sets the read out gains to the amplifiers.

9. A method of controlling white balance in an image pickup apparatus which includes an image pickup unit for photographing an object, a phase difference sensor having a light receiving element, a focus control unit which automatically controls focus of the image pickup unit based on an output from the light receiving element of the phase difference sensor, and an infrared ray sensor for receiving an infrared ray, the method comprising:

determining whether the infrared ray received by the infrared ray sensor corresponds to a command of an infrared ray code signal sent from a remote control unit;

executing a preset action based on the command of the infrared ray code signal when the received infrared ray is determined to correspond to the command of the infrared ray code signal sent from the remote control unit;

judging a type of a light source in surroundings for photography when: (i) the light receiving element of the phase difference sensor detects flicker, and (ii) the infrared ray received by the infrared ray sensor is determined not to correspond to the command of the infrared ray code signal sent from the remote control unit; and controlling the white balance of an image photographed by the image pick-up unit based on the judged type of the light source.

10. A computer readable medium having recorded thereon a program for controlling white balance in an image pickup apparatus which includes an image pickup unit for photographing an object, a phase difference sensor having a light receiving element, a focus control unit which automatically controls focus of the image pickup unit based on an output from the light receiving element of the phase difference sensor, and an infrared ray sensor for receiving an infrared ray, wherein the program controls the image pickup apparatus to perform functions comprising:

determining whether the infrared ray received by the infrared ray sensor corresponds to a command of an infrared ray code signal sent from a remote control unit;

executing a preset action based on the command of the infrared ray code signal when the received infrared ray is determined to correspond to the command of the infrared ray code signal sent from the remote control unit;

judging a type of a light source in surroundings for photography when: (i) the light receiving element of the phase difference sensor detects flicker, and (ii) the infrared ray received by the infrared ray sensor is determined not to correspond to the command of the infrared ray code signal sent from the remote control unit; and controlling the white balance of an image photographed by the image pick-up unit based on the judged type of the light source.

* * * * *